(12) United States Patent
Barker et al.

(10) Patent No.: US 9,039,231 B1
(45) Date of Patent: May 26, 2015

(54) HYBRID LIGHT TOWER SYSTEM

(71) Applicants: Page Barker, Dunlap, TN (US); Michael Thurman, Kennesaw, GA (US); Michael Douglas Zukowski, Signal Mountain, TN (US)

(72) Inventors: Page Barker, Dunlap, TN (US); Michael Thurman, Kennesaw, GA (US); Michael Douglas Zukowski, Signal Mountain, TN (US)

( * ) Notice: Subject to any disclaimer, the term of this patent is extended or adjusted under 35 U.S.C. 154(b) by 86 days.

(21) Appl. No.: 14/036,334

(22) Filed: Sep. 25, 2013

Related U.S. Application Data

(60) Provisional application No. 61/733,950, filed on Dec. 6, 2012, provisional application No. 61/705,814, filed on Sep. 26, 2012, provisional application No. 61/707,163, filed on Sep. 28, 2012, provisional application No. 61/707,153, filed on Sep. 28, 2012.

(51) Int. Cl.
*F21V 33/00* (2006.01)
*F21L 4/08* (2006.01)
*F21L 13/00* (2006.01)

(52) U.S. Cl.
CPC .. *F21L 4/08* (2013.01); *F21L 13/00* (2013.01)

(58) Field of Classification Search
CPC ........ F21L 4/08; F21L 13/00; F21Y 2101/02; F21Y 2105/001
USPC ............... 362/183, 234, 249.02–249.03, 253, 362/276, 285, 485–486, 800, 802
See application file for complete search history.

(56) References Cited

U.S. PATENT DOCUMENTS 8,733,963 B2 * 5/2014 Sharpley et al. .............. 362/183

* cited by examiner

*Primary Examiner* — Jason Moon Han
(74) *Attorney, Agent, or Firm* — Stephen J. Stark

(57) ABSTRACT

A hybrid light tower provides a way to connect a light tower to one of a shore power connection, such as 120V AC or a generator supported by a housing on an axle through a relay. Some embodiments also may have a solar panel and/or batteries for providing electrical power to LED lights of the light tower which require significantly less electrical power than prior art designs. Some embodiments may not have generators, but many will.

20 Claims, 2 Drawing Sheets

HYBRID LIGHT TOWER SYSTEM

CLAIM OF PRIORITY

This application claims the benefit of U.S. Provisional Patent Application Nos. 61/733,950 filed Dec. 6, 2012, 61/705,814 filed Sep. 26, 2012, 61/707,163 filed Sep. 28, 2012 and 61/707,153 filed Sep. 28, 2012, all of which are incorporated herein by reference in their entireties.

FIELD OF THE INVENTION

This invention relates to a hybrid light tower and more particularly, to a portable outdoor lighting system which can power LED lights from a number of power sources.

BACKGROUND OF THE INVENTION

Although various attempts have been made to combine power sources such as shore power, solar power, battery power and/or generator power, portable lighting towers are normally required to have such large power requirements to power traditional lighting fixtures that many of these sources have not been a practical alternative due to the large power consumption of those fixtures.

SUMMARY OF THE INVENTION

Accordingly, a need is believed to exist to provide an improved LED lighting tower.

It is another object of many embodiments of the present invention to provide an improved lighting tower having a capability of being powered from a number of sources.

It is another object of many embodiments of the present invention to provide an improved LED lighting tower having an ability to be powered from solar, battery backup or generator power.

It is another object of many embodiments of the present invention to provide an improved portable lighting tower which provides a unit capable of providing power from solar power, battery backup, generator, or even shore power to power a plurality of positionable LED lights for use in various endeavors, often utilized in the construction industry.

Accordingly, in accordance with a presently preferred embodiment of the present invention, an improved hybrid light tower which can provide an extendable boom supporting at least one if not a plurality of the light fixtures which are preferably LED based and therefore run in a significantly less amperage than their prior art counterparts. In fact, they run so much less that when the generator runs it can be ¼ of the power output of prior art units.

Since lights are LED based lights, they require less than 25% of the energy used by their prior art counterparts. Accordingly, generator can be a gasoline generator or since it can be run at significantly less loading, as to what formerly took 30 to 40 gallons of diesel fuel a week can now take 3 to 4 gallons of gasoline a week to operate the same luminosity as the prior art LEDs.

Also, since such relatively small power requirements are required by the lights, 120 volts shore power can be provided through male electrical connector such as by extension cord. This can be a traditional three-pronged outlet.

Preferably a relay is provided which may sense power from the generator in order to disconnect the electrical connector to ensure generator power is not made available at the electrical connector. Accordingly, relay can be used to connect to only one of the generator or the shore power. If sensing power from the generator, preferentially the relay cannot be closed to link shore power to the generator. Furthermore, the relay may preferentially close to the shore power to lessen the load of the generator. The preference connection to the shore power, in fact, may cause the generator to be stopped if the shore power is found to be available.

The power generated by the generator as well as from the shore power will likely be alternating current. An inverter which then can be provided to use to recharge batteries. A relay can prevent the back flow of electricity back in the opposite direction. Similarly, solar panels can provide direct current directly to the batteries in an effort to potentially charge them. Another relay may be useful to prevent the back flow of electricity from the battery to the solar array if necessary for some embodiments.

From the batteries and/or the solar array, and certainly from the inverter, a DC/AC converter, alternating current can supply the lights such as after passing through on/off switch to provide the desired power.

The batteries, through an inverter, can be used to power the lights. Or the lights can be powered directly by the shore power or the generator, when available. Multiple sources can be used to recharge the batteries. Solar panels and wind turbines can directly charge the batteries. Or alternating current provided by shore power or the generator can be used to power the onboard battery charger.

The applicant is unaware of any attempts to provide such a wide range of alternatives for powering LED lights at a light tower. Furthermore, in prior art lighting systems, the power requirements of lights would be so great that shore power as 120 V A/C power was simply not an option. Furthermore, the relay circuit is believed to prevail providing power at the shore power connection the generator is operating. Certainly, no one wants a exposed energized shore power connection with no shore power being provided.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
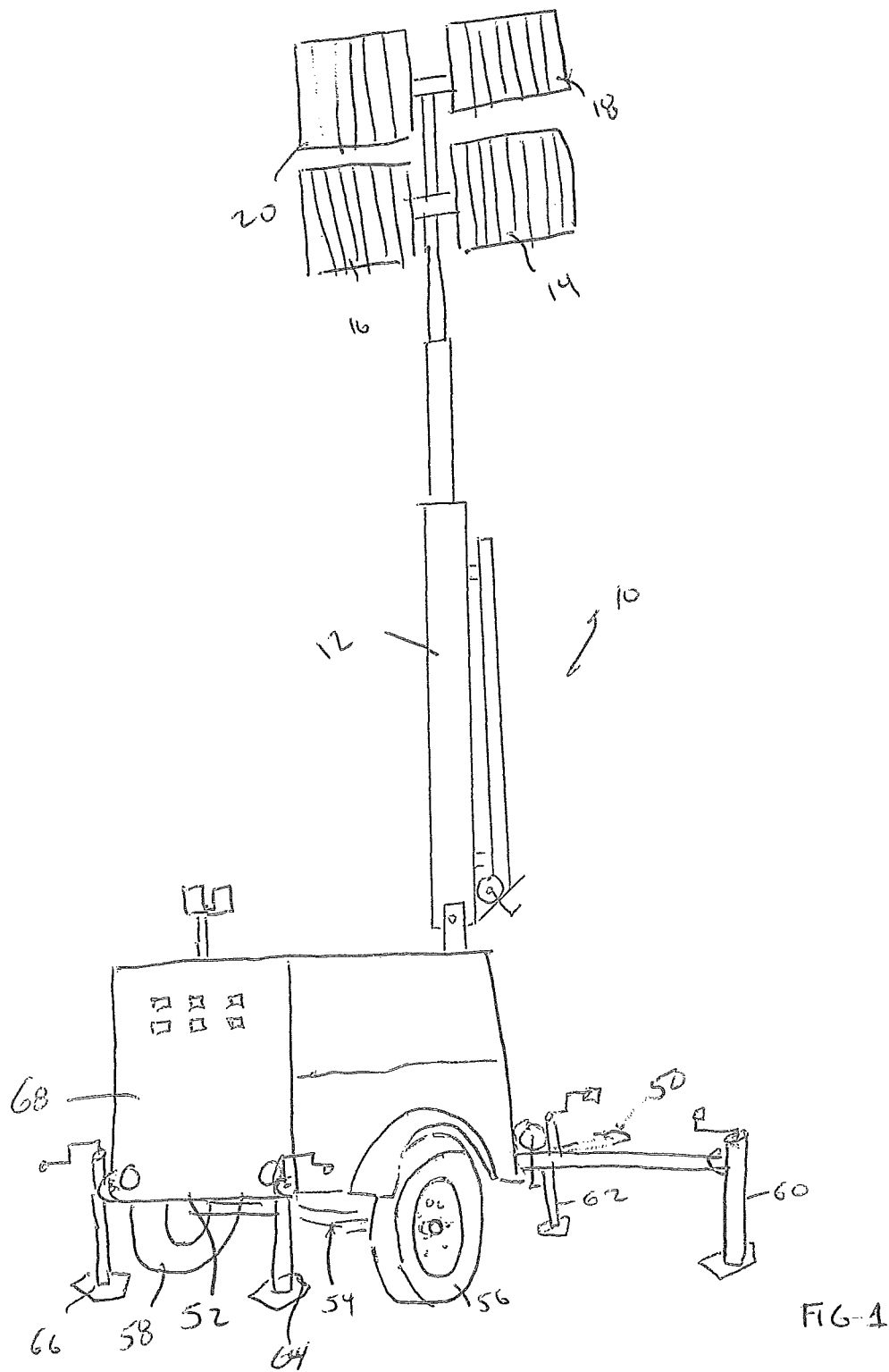
FIG. 1 is a front perspective view of a presently preferred embodiment of the present invention.
Figure 2:
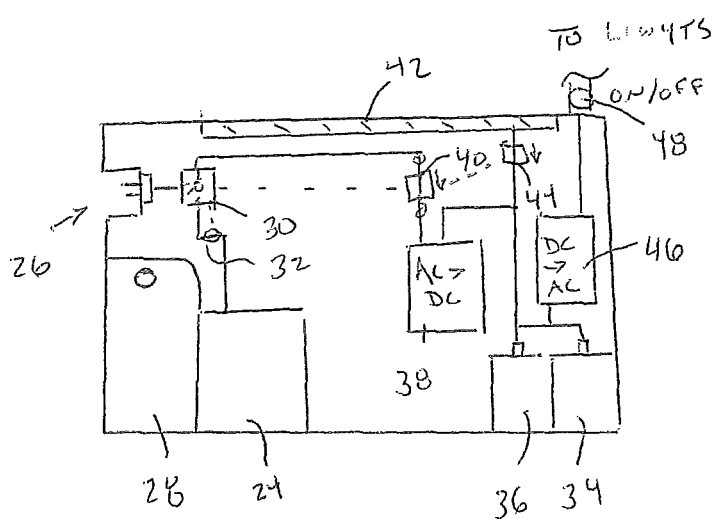
FIG. 2 is a schematic view of the embodiment shown in FIG. 1.

FIGS. 1 and 2 are directed toward an improved light tower 10. This light tower 10 preferably provides an extendable boom 12 which can support a wide plurality of light fixtures 14,16,18,20 which are preferably LED based and therefore operate under a significantly less amount of amperage than their prior art counterparts. In fact, they require so much less than what a generator provides it can run less than 20% the same time required by prior art traditional light units.

Prior art units require diesel generators. During a typical week they would require 30 to 40 gallons of diesel fuel. The applicant's design can operate on as little as 3 to 4 gallons of gasoline a week to provide similar luminosity and duration for lights 14,16,18,20 as prior art lighting alternatives.

Since lights 14,16,18,20 are LED based, 120 V AC shore power (also referred to as 110V) can be provided through a male electrical connector 26 such as by an extension cord. This can be a traditional three-pronged outlet. In prior art designs, 120 V A/C power would have required such high amperage that it is not feasible for traditional light tower constructions.

A relay 30 is provided which will sense power from a generator 24 in order for it to maintain connection to the generator 24. Furthermore, this relay 30 would automatically disconnect the electrical connector 26 which could otherwise connect to shore power when the generator 24 is providing power. Accordingly, the relay 30 can be used to connect only to one of the generator 24 or the shore power electrical connector 26.

A relay 30 is provided that will determine which alternating current source is used, whether it is shore power 26 or generator power 24. The relay 30 is installed so that shore power 26 is normally connected to the electrical system. When the relay 30 senses power from the generator 24 it switches to providing generator 24 power to the electrical system. This prevents both sources from providing power simultaneously, creating an overload. It prevents the generator 24 power from backfeeding to the male plug of the shore power connection 26 creating a shock hazard. It also prevents the generator from backfeeding into utility powerlines in a power outage situation.

If sensing power from the generator 24 preferentially the relay 30 cannot be closed to link shore power to the generator 24. Furthermore, the relay 30 may preference a close to shore power electrical connection 26 to lessen the load on a generator 24. If an attempt is made to plug into shore power through the electrical connection 26 which senses power, it may be the signal is provided to the generator 24 to shut it off possibly in connection with the transfer of power to the shore power connection through the electrical connector 26. Regardless an energized electrical connection 26 is preferably provided without connection to shore power.

Power generated by generator 24 as well as from the shore power connector 26 is alternating current. A battery charger 38 can be used to recharge batteries. The relay 40 can also prevent the backflow of electricity in the opposite direction if utilized. Similarly, solar panels 42 can provide direct current directly to the batteries 34,36 in an effort to potentially charge them if they are not fully charged such as through controller 44 or possibly in other manners as is known in the art. Controller 44 may be coupled to relay 40 to allow only one power source to provide power to lights 14,16,18,20 and/or batteries 34,36. Still other embodiments may be able to direct either or both shore power or electricity from the generator 24 to the lights 14,16,18,20 without conversion to and from direct current.

From the batteries 34,36 and/or from the solar array 42 and certainly from the inverter 38, a D/C-A/C converter 46 can be utilized to change current to alternating current to supply the lights 14,16,18,20 possibly after passing through an on/off switch 48 to provide the desired power to the lights 14,16,18, 20. Of course, in other embodiments, alternating current from shore power connection 26 as well as a generator 24 may be provided directly to the lights 14,16,18,20 without having to go back and forth between the A/C-D/C conversions. Relay 30 is useful to prevent power backfeeding to a shore connection 26 to prevent a situation where energized electrical connector 26 is provided without being connected to shore power to therefore prevent an unnecessary electrical hazard.

Trailer hitch 50 can be used to transport the light tower 10 from one location to another as it preferably operates on a trailer-based frame 52 having axle 54 with wheels 56,58. Steadying supports 62,64,66 are useful in a deployed configuration to ensure that the light tower 10 does not topple unnecessarily in an undesired manner. Housing 68 preferably houses the majority of the components shown in FIG. 2, namely, the generator 24, the fuel tank 28, the relay 30,40, the solar panel 42, the battery 34,36 and the inverter 38 as well as the A/C-D/C converter 46.

This design was not feasible before the advent of LED light fixtures 14,16,18,20 which require significantly less electrical power consumption comparable to existing light towers 10 of prior art design. The prior art designs require about at least about four times the amount of electrical power. 120 V A/C shore power was not a feasible option with these prior art designs due to the high power requirements of the lights.

In the applicant's design, it has been found that the solar array 42 for every two hours of maximum efficiency, one hour of charge can be placed in the batteries 34,36 which could be 12 V or other batteries depending on the specifications of the manufacturer.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A hybrid light tower comprising:
   a housing supported on an axle having wheels, said housing supporting a connector receiving 120V AC from external to the housing;
   a generator supported by the housing;
   a plurality of LED lights connected to the housing; and
   a relay which selectively provides AC power to the LED lights from one of the connector and the generator.

2. The hybrid light tower of claim 1 further comprising batteries, said batteries located in the housing and connectable through a DC to AC converter to provide electrical current to the LED lights.

3. The hybrid light tower of claim 2 further a comprising battery charger supported by the housing, said battery charger at least selectively coupled to the connector in a shore power charge configuration with said battery charger in electrical communication with the connector.

4. The hybrid light tower of claim 3 wherein the relay provides an open configuration preventing the back flow of electricity to either of the generator and to the connector.

5. The hybrid light tower of claim 3 further comprising a solar panel supported by the housing and in at least selective electrical communication with the batteries for charging the batteries.

6. The hybrid light tower of claim 1 wherein the relay preferentially selects the connector for providing AC power to the LED lights.

7. The hybrid light tower of claim 1 further comprising a fuel tank supported by the housing providing fuel to the generator.

8. The hybrid light tower of claim 7 wherein the fuel tank and generator are at least partially located within the housing.

9. The hybrid light tower of claim 1 further comprising an on/off switch for selectively providing electricity to the LED lights.

10. The hybrid light tower of claim 1 wherein the LED lights are supported by a boom operably coupled to the housing above the housing.

11. A hybrid light tower comprising:
a housing supported on an axle having wheels, said housing supporting a connector receiving 120V AC from external to the housing;
a solar panel supported by the housing;
a plurality of LED lights connected to the housing; and
a relay which selectively provides AC power to the LED lights from one of the connector and from a DC to AC converter providing power from a source in at least selective electrical communication with the solar panel.

12. The hybrid light tower of claim 11 further comprising batteries and a battery charger, said solar panel directing DC power to the battery, and said battery directing power through the DC to AC converter to the LED lights.

13. The hybrid light tower of claim 12 further comprising an on/off switch located between the lights and the DC to AC converter.

14. The hybrid light tower of claim 11 further comprising an AC to DC converter supported by the housing which directs DC power through the charger to the battery from the connector in a shore power charging configuration.

15. The hybrid light tower of claim 11 further comprising a generator supported by the housing, said generator selectively connectable by a relay which selects which of the connector and the generator to provide power to the LED lights.

16. The hybrid light tower of claim 15 further a fuel tank supported by the housing.

17. The hybrid light tower of claim 16 wherein the fuel tank and the generator are located within the housing.

18. The hybrid light tower of claim 11 further comprising a boom supporting the LED lights cantilveredly above the housing.

19. The hybrid light tower of claim 11 wherein the solar panels are connected to an exterior upper surface of the housing.

20. The hybrid light tower of claim 11 wherein the relay at least assists in connecting two AC sources simultaneously.

* * * * *